US009752630B2

(12) United States Patent
Yuasa

(10) Patent No.: US 9,752,630 B2
(45) Date of Patent: Sep. 5, 2017

(54) CENTRIFUGAL CLUTCH

(71) Applicant: Kawasaki Jukogyo Kabushiki Kaisha, Hyogo (JP)

(72) Inventor: Tsuneyoshi Yuasa, Kobe (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 121 days.

(21) Appl. No.: 14/815,757

(22) Filed: Jul. 31, 2015

(65) Prior Publication Data

US 2016/0069401 A1 Mar. 10, 2016

(30) Foreign Application Priority Data

Sep. 9, 2014 (JP) ................................. 2014-182841

(51) Int. Cl.
| F16D 43/18 | (2006.01) |
| A01D 69/08 | (2006.01) |
| A01D 34/90 | (2006.01) |
| F16D 43/14 | (2006.01) |

(52) U.S. Cl.
CPC ............ *F16D 43/18* (2013.01); *A01D 34/90* (2013.01); *A01D 69/08* (2013.01); *F16D 2043/145* (2013.01)

(58) Field of Classification Search
CPC .......... F16D 43/18; F16D 43/21; F16D 43/22; F16D 2043/145; F16D 13/62
See application file for complete search history.

(56) References Cited

U.S. PATENT DOCUMENTS 4,254,854 A * 3/1981 St. John ................. F16D 43/18
188/184
4,296,852 A * 10/1981 Luerken ................. F16D 43/18
192/104 B
6,253,896 B1 * 7/2001 Notaras ................. F16D 43/18
192/105 CD
8,721,487 B2 5/2014 Ishida et al.
2008/0053783 A1 * 3/2008 Lean ....................... F16D 43/14
192/105 CD
2013/0345012 A1 12/2013 Ishida et al.

FOREIGN PATENT DOCUMENTS

| CN | 85107835 | 4/1986 |
| CN | 87206818 | 3/1988 |
| CN | 2063995 | 10/1990 |
| JP | 04-106532 | 9/1992 |
| JP | 2014-001837 | 1/2014 |

OTHER PUBLICATIONS

First Office Action dated May 31, 2017 for Corresponding Chinese Patent Application No. 201510547624.X with English language translation of the Search Report attached to the Office Action (7 pages).

* cited by examiner

*Primary Examiner* — Huan Le

(57) ABSTRACT

A centrifugal clutch intermittently transmits power of rotation about an axis. The centrifugal clutch includes: a plurality of clutch shoes that are pressed against an inner peripheral surface of a clutch drum; a plurality of pivot members configured to rotatably support the clutch shoes; and a pressing member having a plurality of insertion portions that are inserted between head portions of the pivot members and the clutch shoes. The pressing member has a connecting portion that connects between the plurality of insertion portions, and the insertion portions and the connecting portion are curved in a direction of the axis.

7 Claims, 8 Drawing Sheets

CENTRIFUGAL CLUTCH

CROSS REFERENCE TO THE RELATED APPLICATION

This application is based on and claims Convention priority to Japanese patent application No. 2014-182841, filed Sep. 9, 2014, the entire disclosure of which is herein incorporated by reference as a part of this application.

BACKGROUND OF THE INVENTION

Field of the Invention

The present invention mainly relates to centrifugal clutches for small engines that drive work machines such as bush cutters.

Description of Related Art

For a small engine having a centrifugal clutch, for example, during acceleration of the engine, engagement of the clutch is started at or around a time when the rotation rate of the engine or the engine speed reaches 3800 rpm, and the clutch is completely engaged when the engine speed reaches about 7000 rpm. An unusual sound may be generated in a partially-engaged clutch state where the clutch is shifting from the start of engagement of the clutch to the complete engagement of the clutch. Such an unusual sound is generated, for example, as follows.

When the engine speed is increased to start engagement of the clutch, the engine speed is reduced due to a load of a cutting blade, and thus, the clutch may be disengaged. Also in this state, the cutting blade continues to rotate due to inertial force. When the clutch is disengaged, the rotation of the cutting blade is gradually reduced, and then, the engine speed is increased again due to reduction of the load, to restart engagement of the clutch. The engine speed is then reduced due to the load of the cutting blade, to disengage the clutch again. Thus, since engagement and disengagement of the clutch are repeated, contact between a clutch shoe and a clutch drum is repeated to generate an unusual sound.

In order to reduce generation of such an unusual sound, it has been known that a holder plate is mounted to one of side surfaces of the clutch shoe, and a pressing plate is mounted to the other of the side surfaces of the clutch shoe, to hold the clutch shoe between the holder plate and the pressing plate (Japanese Laid-Open Utility Model Publication No. H04-106532). In Japanese Laid-Open Utility Model Publication No. H04-106532, the clutch shoe is elastically held from both the side surfaces by the holder plate and the pressing plate, thereby reducing unstable operation of the clutch shoe to reduce generation of an unusual sound.

However, according to Japanese Laid-Open Utility Model Publication No. H04-106532, two components (the holder plate and the pressing plate) are necessary, and each plate has four pressing portions, thereby complicating the structure. Furthermore, the clutch shoe needs to have receiver portions for receiving the pressing portions, thereby limiting the structure of the clutch shoe.

SUMMARY OF THE INVENTION

An object of the present invention is to provide a centrifugal clutch that allows generation of an unusual sound to be reduced with a simple structure.

In order to accomplish the above object, a centrifugal clutch of the present invention is intermittently transmits power of rotation about an axis, and includes: a clutch drum; a plurality of clutch shoes that are pressed against an inner peripheral surface of the clutch drum; a plurality of pivot members configured to rotatably support the clutch shoes; and a pressing member having a plurality of insertion portions that are inserted between head portions of the pivot members and the clutch shoes. The pressing member has a connecting portion that connects between the plurality of insertion portions, and the insertion portions and the connecting portion are curved in a direction of the axis.

In the above configuration, a force in the axial direction is applied to the clutch shoes due to an elastic force of the pressing member that is curved in the axial direction. As a result, the operation of the clutch shoes performed, when the clutch comes into engagement, is stabilized, thereby to reduce generation of an unusual sound in the case of contact between the clutch shoes and the clutch drum being repeated. The pressing member is inserted only between the head portions of the pivot members and the clutch shoes, and has a simple structure in which the insertion portions is inserted between the head portions and the clutch shoes and the connecting portion connects between the insertion portions. The bending angle at each insertion portion is reduced to increase durability, compared with a case where only the insertion portions are bent to exert spring force.

In the present invention, the insertion portions and the connecting portion are preferably curved inward in the direction of the axis. In this configuration, when the pivot members are fastened, a contact area in which the insertion portions contact with the clutch shoes is increased. As a result, the operation of the clutch shoes performed, when the clutch comes into engagement, is stabilized with enhanced effectiveness. Instead thereof, the insertion portions and the connecting portion may be curved outward in the direction of the axis. In this configuration, contact of the connecting portion with the spring can be easily avoided.

In the present invention, the insertion portions are preferably provided with insertion holes into which the pivot members are inserted. In this configuration, when the pivot members are fastened, a contact area in which the insertion portions contact with the clutch shoes is increased. Therefore, the operation of the clutch shoes performed, when the clutch comes into engagement, is stabilized with enhanced effectiveness. Instead thereof, each insertion portion may have an arc-shaped portion formed along a portion, closer to the axis, of an outer periphery of each pivot member. In this configuration, the pivot members can be easily inserted into the insertion portions, thereby facilitating the assembling.

In the present invention, a gap between the head portions of the pivot members and the clutch shoes is of a dimension G, and a plate thickness T of the pressing member is preferably set within the range of 0.4G to 0.6G. When the plate thickness T is less than a force with which the pressing member presses the clutch shoes is reduced, and the operation of the clutch shoes is not stabilized. When the plate thickness T is greater than 0.6G, it is difficult to obtain an advantageous curved shape at each insertion portion.

In the present invention, a distance between axes of the pivot members is of a dimension D, and a radius of curvature R formed by the insertion portions and the connecting portion that are curved is preferably set within the range of 2D to 4D. When the radius of curvature R is less than 2D, expansion of the pressing member in the axial direction is increased, and a difference in position in the axial direction between the end of each insertion portion and the center of the connecting portion is increased. Therefore, the pressing member may interfere with another component, and a force with which the pressing member presses the clutch shoes is excessively enhanced, whereby the operation of the clutch shoes may become slow. When the radius of curvature R is greater than 4D, a difference in position in the axial direction between the end of each insertion portion and the center of the connecting portion is reduced. Therefore, a force with which the pressing member presses the clutch shoes is reduced, and the operation of the clutch shoes may not be stabilized, so that an unusual sound is likely to be generated.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
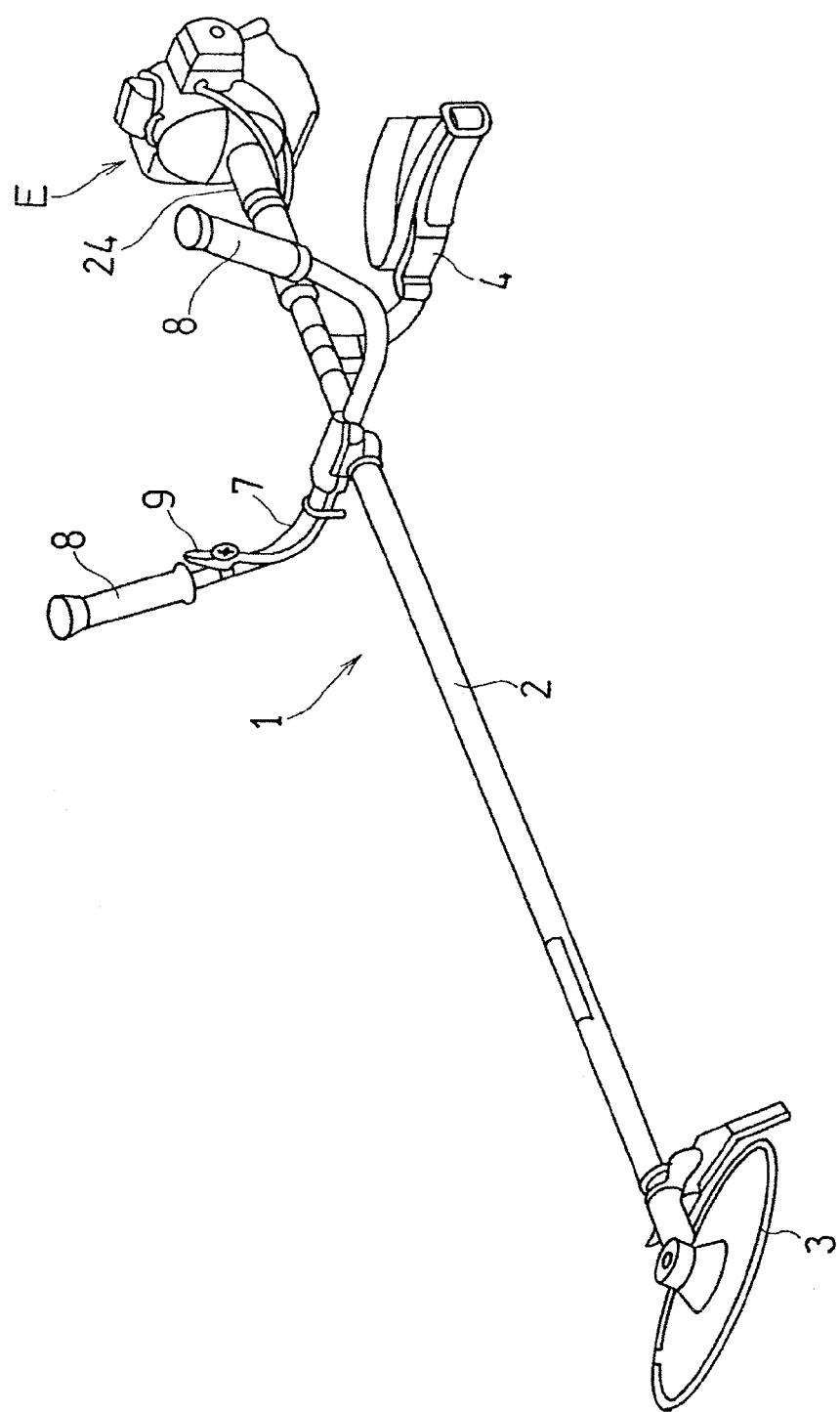
FIG. 1 is a perspective view of a bush cutter equipped with an engine having a centrifugal clutch according to a first preferred embodiment of the present invention.

Hereinafter, preferred embodiments of the present invention will be described with reference to the drawings. FIG. 1 illustrates a bush cutter 1 which is one kind of hand-held work machine quipped with a small engine E having a centrifugal clutch according to a first preferred embodiment of the present invention. The engine E is mounted to a base end portion of a long main pipe 2 made of a metal such as an aluminium alloy, and a rotary cutting blade 3 is mounted, as a work tool, to a tip end portion of the main pipe 2. A drive shaft 6 (FIG. 2) made of an iron-based material is inserted in the main pipe 2. A base end portion 6a of the drive shaft 6 is connected to the engine E through a centrifugal clutch 20 described below, and a tip end portion of the drive shaft 6 is connected to the rotary cutting blade 3 shown in FIG. 1.

Figure 2:
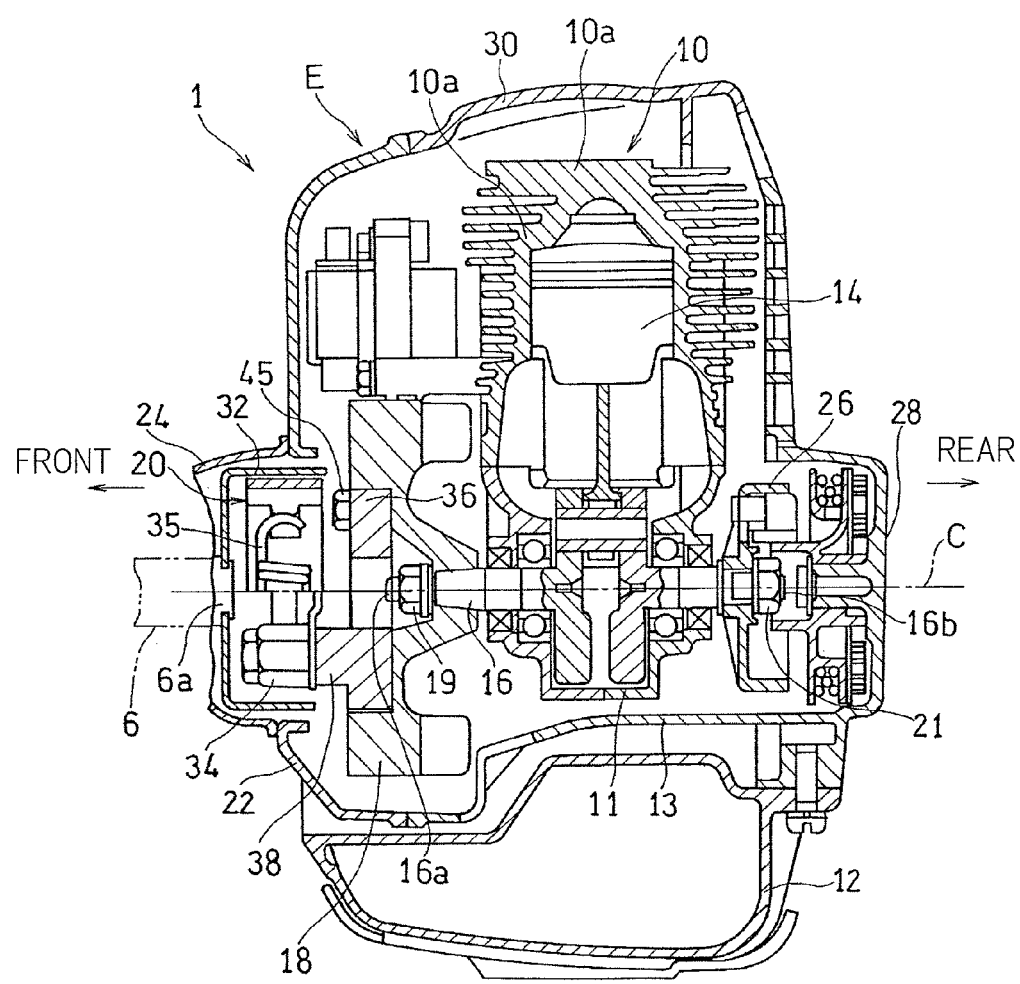
FIG. 2 is a longitudinal cross-sectional view of the engine.

The main pipe 2 has a shoulder belt 4 and a U-shaped handle 7 mounted near the engine E (FIG. 2). An operator hangs the belt 4 over the shoulder to hold the bush cutter 1, and holds grips 8 on both end portions of the handle 7 to operate the bush cutter 1, whereby the operator is allowed to cut weeds and the like by means of the cutting blade 3 driven by the engine E. The rotational speed of the cutting blade 3 is adjusted by operating a throttle lever 9 disposed near one end portion of the handle.

The engine E is, for example, a two-cycle engine. As shown in FIG. 2, the engine E has a cylinder block 10 having a cylinder 10a and a cylinder head integrally formed. The cylinder block 10 is connected to a crankcase 11, to form an engine body. The cylinder and the cylinder head may be separate components, respectively. A fuel tank 12 is mounted to a lower portion of the crankcase 11. The engine E may be a four-cycle engine.

A piston 14 is slidably accommodated in a bore of the cylinder 10a of the cylinder block 10. The piston 14 is connected to a crankshaft 16 supported by the crankcase 11. The crankshaft 16 defines as a rotation shaft of the engine E, and has male screws formed on both axial ends of the crankshaft 16. A flywheel 18 that doubles as a cooling fan is mounted at one end portion 16a (front end portion) of the crankshaft 16, and is fixedly fastened, by a nut 19, to the crankshaft 16 such that the flywheel 18 is not rotatable relative to the crankshaft 16. The centrifugal clutch 20 for transmitting output from the engine E to the drive shaft 6 of the bush cutter 1 (FIG. 1) is mounted to the flywheel 18.

The flywheel 18 that doubles as the cooling fan is covered by a fan housing 22 mounted to the crankcase 11. The fan housing 22 is mounted to an engine case 13 that covers the lower portion of the engine E. A clutch housing 24 is mounted to the fan housing 22. A starter pulley 26 is mounted to the other end portion 16b (rear end portion) of the crankshaft 16 by means of a nut 21. A recoil starter 28, that allows the crankshaft 16 to rotate through the starter pulley 26 at the time of start, is disposed outward of the starter pulley 26. A shroud 30 made of a resin is fixed to the fan housing 22 and the crankcase 11 by means of a bolt (not shown), and the shroud 30 covers the upper half part of the engine E including the cylinder block 10.

Figure 3:
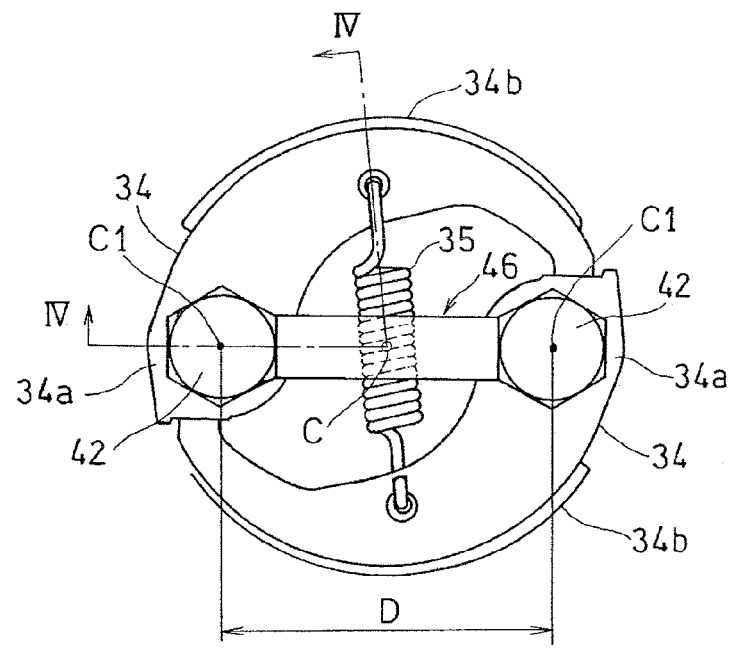
FIG. 3 is a front view of a clutch shoe of the centrifugal clutch.

The centrifugal clutch 20 of the present embodiment will be described. The centrifugal clutch 20 intermittently transmits power of rotation of the crankshaft 16 about an axis C of the crankshaft 16. The centrifugal clutch 20 includes: a clutch drum 32 connected to the cutting blade 3 (FIG. 1) through the drive shaft 6; and a pair of clutch shoes 34 connected to the crankshaft 16 through the flywheel 18. The clutch shoes 34 are pressed against an inner peripheral surface of the clutch drum 32 due to centrifugal force caused by rotation of the crankshaft 16, to transmit power to the clutch drum 32 by friction. As shown in FIG. 3, the paired clutch shoes 34 oppose each other across the rotation axis C of the crankshaft 16.

The clutch drum 32 shown in FIG. 2 has a bowl-like shape that is open rearward (rightward in FIG. 2) in the axial direction. The base end portion 6a of the drive shaft 6 is connected to the bottom portion that is the front end portion of the clutch drum 32 such that the clutch drum 32 and the drive shaft 6 are not rotatable relative to each other. The crankshaft 16, the centrifugal clutch 20 and the drive shaft 6 are substantially concentric with each other so as to have the common rotation axis C.

As shown in FIG. 3, each clutch shoe 34 includes: a supported portion 34a supported by the flywheel 18 in the structure described below; and a connection portion 34b that moves outward in the radial direction due to the centrifugal force to connect with the clutch drum 32. The pair of clutch shoes 34, 34 are connected with each other by a clutch spring 35, which spring 35 urges the connection portions 34b, 34b of those clutch shoes 34, 34 in the radially inward direction by its spring force. The supported portion 34a of each clutch shoe 34 is connected to the flywheel 18 through a holder 36 made of a metal, as shown in FIG. 2. The holder 36 is fixed to the flywheel 18 by means of a bolt 45.

Figure 4:
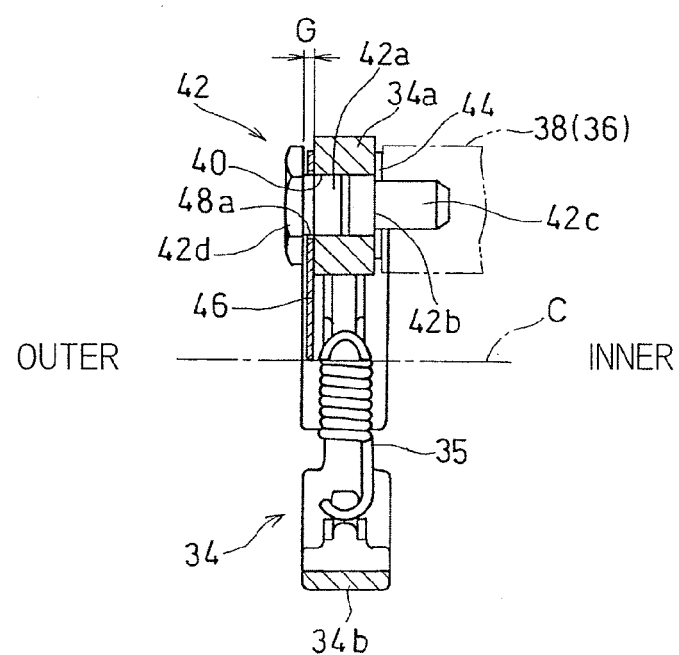
FIG. 4 is a cross-sectional view taken along a line IV-IV in FIG. 3.

The holder 36 has two bosses 38 integrated therewith, and the bosses 38 protrude forward in the axial direction. The two bosses 38 are disposed so as to be symmetric with respect to the rotation axis C. As shown in FIG. 4, a pivot member 42 is inserted into a bolt insertion hole 40 formed in the supported portion 34a of each clutch shoe 34, and a screw portion 42c of the pivot member 42 is fastened into a threaded hole (not shown) of each boss 38, whereby each clutch shoe 34 is rotatably supported by the holder 36.

In the present embodiment, a stepped bolt is used as the pivot member 42. The pivot member 42 that is the stepped bolt 42 includes: a large diameter portion 42a having an outer peripheral surface formed as a cylindrical surface that is not threaded; the screw portion 42c having a diameter smaller than the large diameter portion 42a; and a stepped portion 42b formed between the large diameter portion 42a and the screw portion 42c. A flat washer 44 is disposed between the stepped portion 42b and the boss 38, and the stepped portion 42b is pressed against the flat washer 44, whereby the stepped portion 42b is indirectly pressed against the end surface of the boss 38. The flat washer 44 may not be provided, and in this case, the stepped portion 42b is directly pressed against the end surface of the boss 38. A pressing member 46 is interposed between a head portion 42d of each stepped bolt 42, and the supported portion 34a of each clutch shoe 34. The head portion 42d of the stepped bolt 42 has a diameter greater than the large diameter portion 42a, and has a polygonal or circular shape as viewed in the axial direction. In the case of the head portion 42d having a polygonal shape, the diameter of the inscribed circle of the polygonal shape is greater than the diameter of the large diameter portion 42a. In the case of the head portion 42d having a circular shape, the diameter of the circular shape is greater than the diameter of the large diameter portion 42a.

Figure 5:
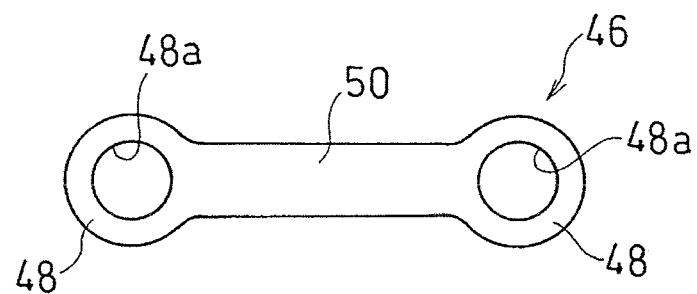
FIG. 5 is a front view of a pressing member of the centrifugal clutch.
Figure 6:
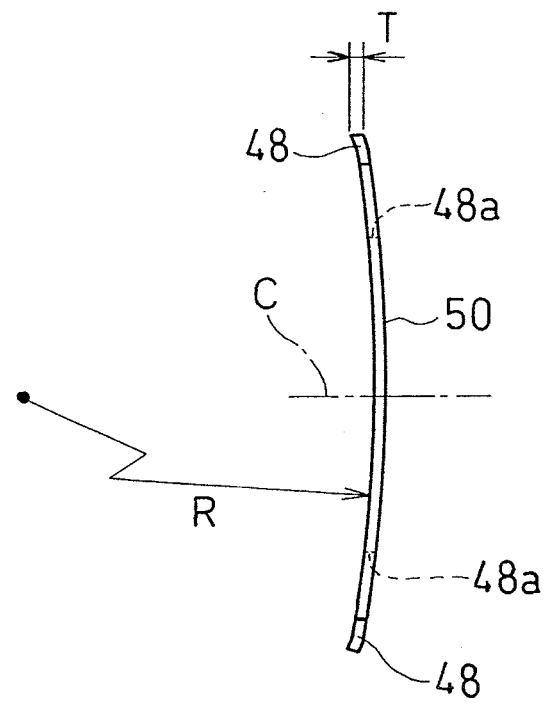
FIG. 6 is a side view of the pressing member.

As shown in FIG. 5, the pressing member 46 is in the form of a plate member made of a metal, and includes: two insertion portions 48 that are inserted between the head portion 42d (FIG. 4) of each stepped bolt 42 and each clutch shoe 34 (FIG. 4); and a connecting portion 50 that connects between the insertion portions 48 and 48. For example, as the material of the pressing member 46, stainless steel strips for springs (SUS304-CSP) is used. However, the material of the pressing member 46 is not limited thereto. Each insertion portion 48 is provided with an insertion hole 48a through which the stepped bolt 42 is inserted. As shown in FIG. 6, the insertion portions 48 and the connecting portion 50 of the pressing member 46 are curved inward in the axis C direction, that is, curved toward the clutch shoes 34 (FIG. 4).

In a state where the stepped bolts 42 shown in FIG. 4 are fastened, a gap in the axial direction is formed between the head portion 42d of each stepped bolt 42, and each clutch shoe 34. The gap in the axial direction is of a dimension G, and a plate thickness T (FIG. 6) of the pressing member 46 is preferably set within the range of 0.4G to 0.6G. In the present embodiment, the plate thickness T of the pressing member 46 is about 0.5G. When the plate thickness T is less than 0.4G, a force, with which the pressing member 46 presses the clutch shoes 34, is reduced, and therefore, the operation of the clutch shoes 34 is not stabilized. When the plate thickness T is greater than 0.6G, it is difficult to obtain an advantageous curved shape at each insertion portion 48.

A distance between the axes C1 and C1 of the stepped bolts 42 and 42 is of a dimension D (shown in FIG. 3), and a radius of curvature R formed by the insertion portions 48 and the connecting portion 50 of the pressing member 46 that is curved as shown in FIG. 6 is preferably set within the range of 2D to 4D. In the present embodiment, the radius of curvature R of the pressing member 46 is about 3D. When the radius of curvature R is less than 2D, expansion of the pressing member 46 in the axial direction is increased, and a difference in position in the axial direction between the tip end of each insertion portion 48 and the center of the connecting portion 50 is increased. Therefore, the pressing member 46 may interfere with another component, and a force with which the pressing member 46 presses the clutch shoes 34 is excessively increased, whereby the operation of the clutch shoes 34 may become slow. When the radius of curvature R is greater than 4D, a difference in position in the axial direction between the tip end of each insertion portion 48 and the center of the connecting portion 50 is reduced. Therefore, a force with which the pressing member 46 presses the clutch shoes 34 is reduced, and the operation of the clutch shoes 34 may not be stabilized, so that an unusual sound is likely to be generated.

Figure 7:
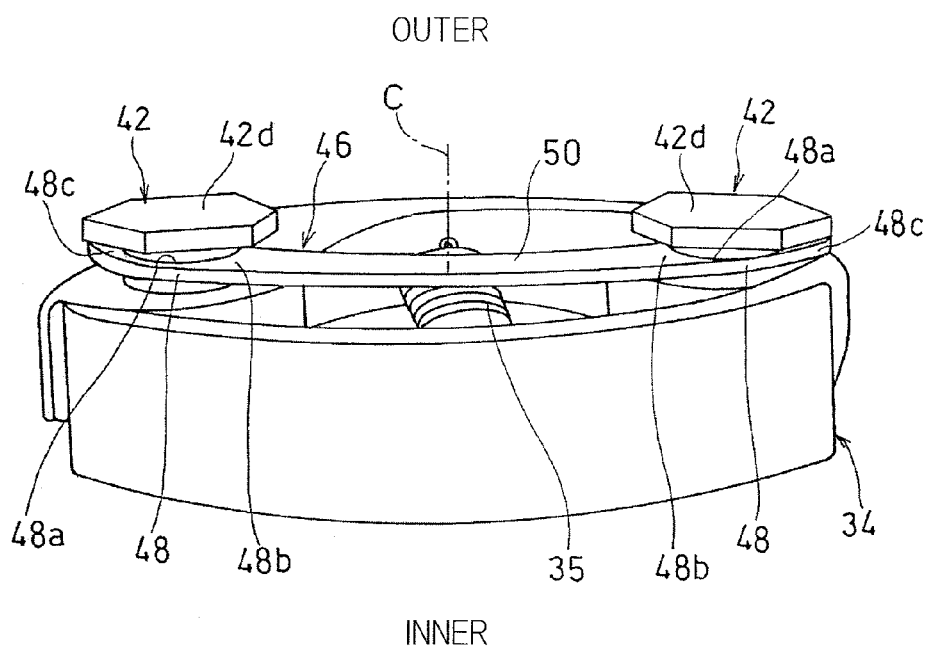
FIG. 7 is a perspective view illustrating a state of the clutch shoe before a stepped bolt is fastened.

FIG. 7 illustrates the clutch shoes 34 before the stepped bolts 42 are fastened. As is apparent from FIG. 7, before the stepped bolts 42 are fastened, a root portion of each insertion portion 48 of the pressing member 46, that is, a connection portion 48b connected to the connecting portion 50, is disposed on the inner side in the axis C direction, that is, on the side closer to each clutch shoe 34. A tip end portion 48c of each insertion portion 48 is disposed on the outer side in the axis C direction, that is, on the side closer to the head portion 42d of the stepped bolt 42. When the stepped bolts 42 are fastened in this state, the insertion portions 48 of the pressing member 46 are pressed against the end surfaces of the supported portions 34a of the clutch shoes 34, and the curved pressing member 46 is gradually flattened, finally to be substantially flat after the stepped bolts 42 have been fastened.

Figure 8:
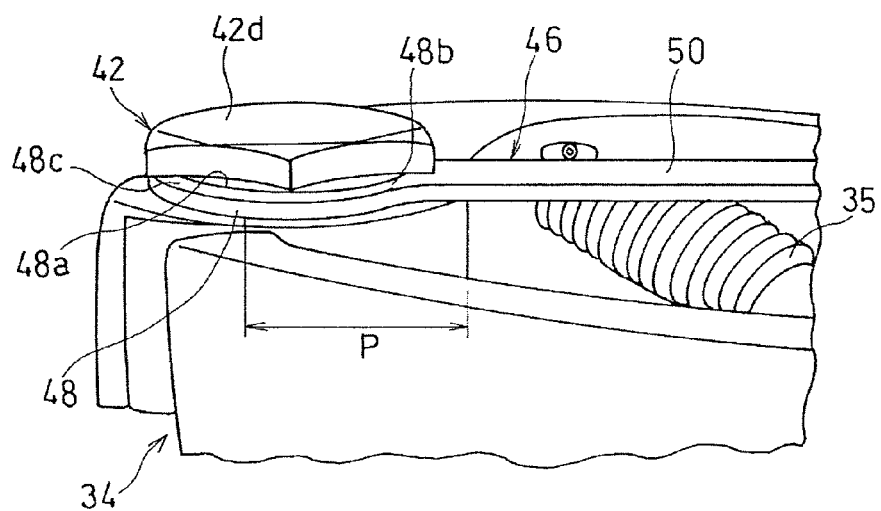
FIG. 8 is a perspective view illustrating a state of the clutch shoe after the stepped bolt has been fastened.

FIG. 8 illustrates the centrifugal clutch 20 after the stepped bolts 42 have been fastened. While the dimension G (FIG. 4) of the gap, in the axial direction, between the head portion 42d of each stepped bolt 42 and each clutch shoe 34 is greater than the plate thickness T (FIG. 6) of the pressing member 46, the connection portion 48b of each insertion portion 48 of the pressing member 46, and a portion of each connection portion 48b closer to the center (a range indicated by P in FIG. 8) are pressed against each clutch shoe 34 due to an elastic force of the curved pressing member 46. The tip end portion 48c of each insertion portion 48 is slightly distant from the end surface of the supported portion 34a of each clutch shoe 34.

Figure 9A:
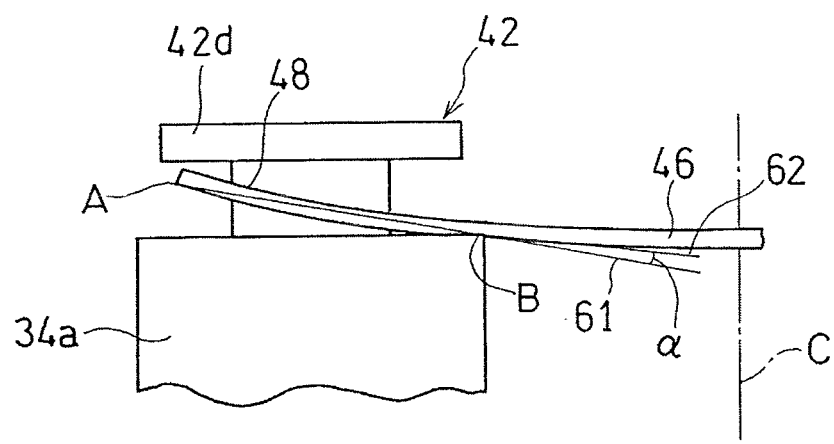
FIG. 9A is a side view schematically illustrating a state of the pressing member before the stepped bolt is fastened.
Figure 9B:
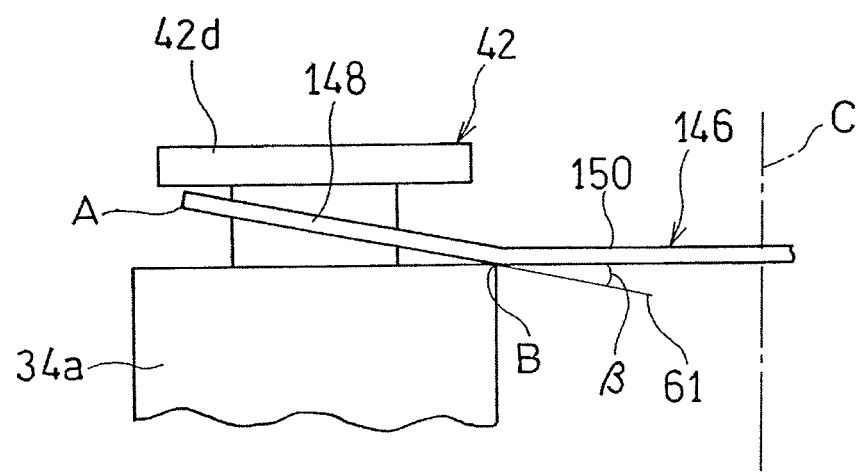
FIG. 9B is a side view schematically illustrating a state of a pressing member of comparative example before a bolt is fastened.

FIGS. 9A and 9B and FIGS. 10A and 10B schematically illustrate states of the pressing member 46 before the stepped bolts 42 are fastened and after the stepped bolts 42 have been fastened. As shown in FIG. 9A, when the stepped bolts 42 are under no load, that is, in a natural state, a bending angle α between a straight line 61 and a tangent line 62 is small, that is, for example, about 2° to 3°. The straight line 61 is formed by connecting between a tip end A on the inner side of the insertion portion 48 of the pressing member 46 and an inner side contact portion B of the pressing member 46, which contacts with the supported portion 34a. The tangent line 62 is a line tangent to a curved surface at the inner side contact portion B. On the other hand, as shown in FIG. 9B, in a case where a pressing member 146 is used in which insertion portions 148 are bent and a connecting portion 150 is straight-line shaped, a bending angle β is great, that is, about 5° to 10°, to obtain a sufficient elastic force.

Figure 10A:
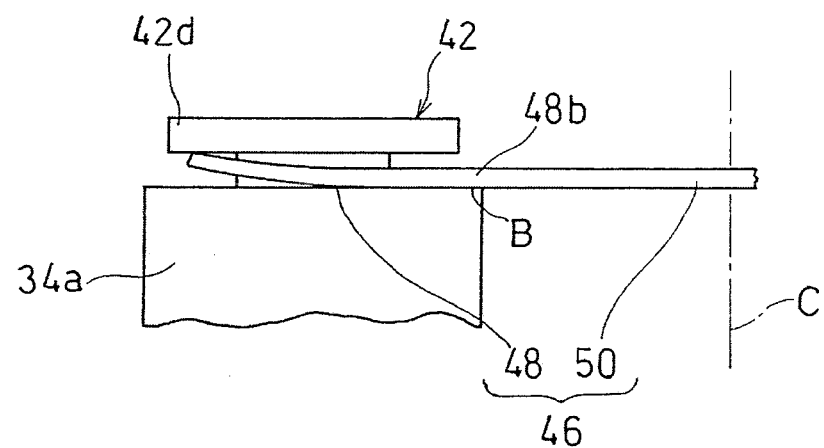
FIG. 10A is a side view schematically illustrating a state of the pressing member after the stepped bolt has been fastened.
Figure 10B:
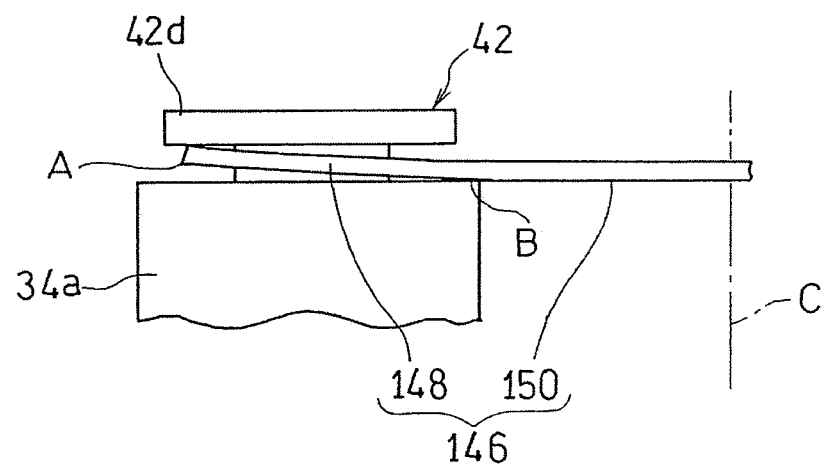
FIG. 10B is a side view schematically illustrating a state of the pressing member of comparative example after the bolt has been fastened.

Therefore, the pressing member 46 shown in FIG. 9A is merely extended, after the stepped bolts 42 have been fastened as shown in FIG. 10A, so as to reduce the bending angle by about 1° to 2°, whereby durability becomes high. On the other hand, the pressing member 146 shown in FIG. 9B is greatly extended, after the stepped bolts 42 have been fastened as shown in FIG. 10B, so as to reduce the angle β by about 3° to 5°, whereby durability becomes low. In the comparative example shown in FIG. 10B, the pressing member 146 and the supported portion 34a of each clutch shoe 34 are brought into line contact with each other at a line passing through the point B. In the first embodiment shown in FIG. 10A, the pressing member 46 and the supported portion 34a of each clutch shoe 34 contact with each other on a wide arc-shaped contact surface including the point B, so that an elastic force with which the pressing member 46 presses the clutch shoes 34 acts on a wide surface of the clutch shoes 34. Thus, the tilt of the clutch shoes 34 is reduced to stabilize the clutching operation.

An operation of the centrifugal clutch 20 of the present embodiment will be described. When the engine E shown in FIG. 2 is started up, the crankshaft 16, the flywheel 18 fixed to the crankshaft 16, the holder 36 connected to the flywheel 18, and the clutch shoes 34 supported by the holder 36 are rotated. When the engine speed is increased, the centrifugal force of the clutch shoes 34 is increased, and each connection portion 34b rotates about the axis C1 of the stepped bolt 42 against the spring force of the clutch spring 35, to approach and contact with the clutch drum 32, thereby starting engagement of the clutch.

When engagement of the clutch is started, switching of the clutch between on and off as described in BACKGROUND OF THE INVENTION is repeated, whereby contact between the clutch shoes 34 and 34, and contact between the clutch shoes 34 and the clutch drum 32 are repeated.

As described above, portions near the insertion holes 48a, around the stepped bolts 42, of the insertion portions 48 of the pressing member 46, and portions of the insertion portions 48 closer to the center are pressed against the clutch shoes 34 due to an elastic force of the pressing member 46, shown in FIG. 4, which is curved, thereby stabilizing movement of the clutch shoes 34 in the circumferential direction. As a result, sound generated when contact between the clutch shoes 34 and 34 and contact between the clutch shoes 34 and the clutch drum 32 are repeated, is reduced.

When the engine speed is further increased, the rotational speed of each clutch shoe 34 is also increased, whereby the clutch 20 shown in FIG. 2 becomes completely engaged, and the cutting blade 3 shown in FIG. 1 is rotated at a high speed through the clutch 20 and the drive shaft 6.

The pressing member 46 is inserted only between the head portions 42d of the stepped bolts 42 and the clutch shoes 34, and has a simple structure in which the insertion portions 48 are inserted between the head portions 42d and the clutch shoes 34 and the connecting portion 50 connects between the insertion portions 48, thereby facilitating manufacturing of the pressing member 46. The bending angle at each insertion portion 48 is reduced to increase durability, compared with a case where only the insertion portions 148 (FIG. 9B) are bent to exert spring force.

As shown in FIG. 6, the insertion portions 48 and the connecting portion 50 of the pressing member 46 are curved inward in the axial direction. Thus, when the stepped bolts 42 are fastened as shown in FIG. 8, a contact area in which the insertion portions 48 contact with the clutch shoes 34 is increased. As a result, the operation of the clutch shoes 34, when the clutch comes into engagement, is stabilized effectively.

Further, each insertion portion 48 is provided with the insertion hole 48a in which the stepped bolt 42 is inserted. Thus, when the stepped bolts 42 are fastened, a contact area in which the insertion portions 48 contact with the clutch shoes 34 is increased, whereby the operation of the clutch shoes 34, when the clutch comes into engagement, is stabilized further effectively.

Figure 11:
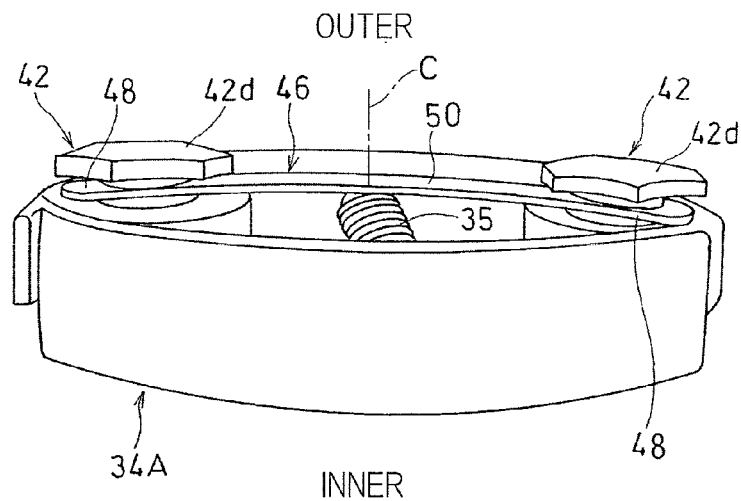
FIG. 11 is a perspective view illustrating a state of a clutch shoe, according to a second preferred embodiment of the present invention, before the stepped bolt is fastened.

FIG. 11 illustrates a state of clutch shoes 34A of a centrifugal clutch, according to a second preferred embodiment of the present invention, before the stepped bolts 42 are fastened. The centrifugal clutch according to the second embodiment is different from the centrifugal clutch 20 according to the first embodiment in that, in the second embodiment, the insertion portions 48 and the connecting portion 50 of the pressing member 46 are curved outward in the axis C direction. The other structures are the same between the first and the second embodiments.

Also in the second embodiment, similarly to the first embodiment, a force in the axial direction is applied to the clutch shoes 34 due to an elastic force of the pressing member 46, and, as a result, the operation of the clutch shoes 34, when the clutch comes into engagement is stabilized, to reduce generation of an unusual sound. Further, according to the second embodiment, the pressing member 46 is curved outward in the axis C direction, thereby easily avoiding contact of the connecting portion 50 with the spring 35.

Figure 12:
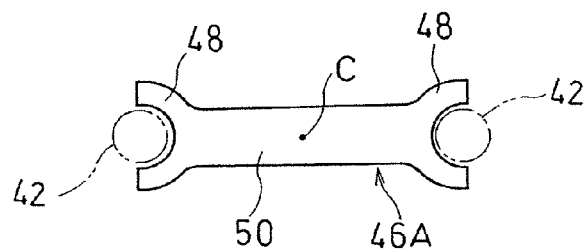
FIG. 12 is a front view of a pressing member of a centrifugal clutch according to a third preferred embodiment of the present invention.

FIG. 12 illustrates a pressing member 46A of a centrifugal clutch according to a third preferred embodiment of the present invention. In the pressing member 46A of the third embodiment, each insertion portion 48 is formed by an arc-shaped portion along a portion, closer to the axis C, of the outer periphery of the stepped bolt 42. Each insertion portion 48 is preferably formed in a semicircular arc shape. The other structure of the pressing member 46A is the same as the structure of the pressing member 46 of the first embodiment. Also in the third embodiment, the same effect as in the first embodiment can be obtained. According to the third embodiment, the stepped bolts 42 can be easily inserted into the insertion portions 48, thereby facilitating the assembling.

Figure 13:
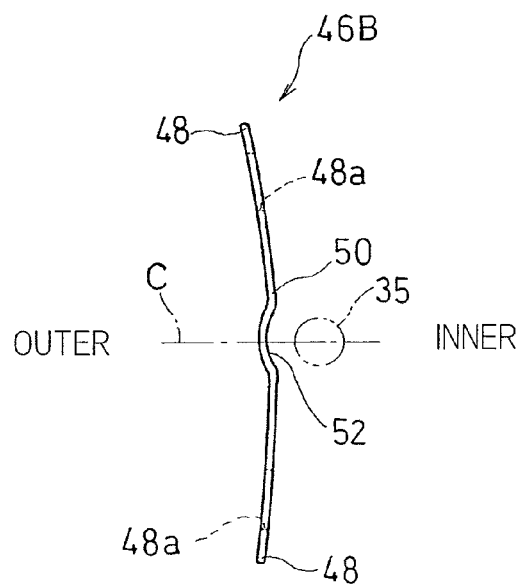
FIG. 13 is a side view of a pressing member of a centrifugal clutch according to a fourth preferred embodiment of the present invention.

FIG. 13 illustrates a pressing member 46B of a centrifugal clutch according to a fourth preferred embodiment of the present invention. The pressing member 46B of the fourth embodiment is provided with a recess 52 formed at the center portion, in the longitudinal direction (the up-down direction), of the connecting portion 50 so as to be recessed outward. The other structure of the pressing member 46B is the same as the structure of the pressing member 46 of the first embodiment. Also in the fourth embodiment, the same effect as in the first embodiment can be obtained. According to the fourth embodiment, since the recess 52 is formed at the center portion, in the longitudinal direction, of the connecting portion 50, contact of the connecting portion 50 with the spring 35 can be easily avoided, and an elastic force of the pressing member 46B can be further increased. As a result, the operation of the clutch shoes 34, when the clutch comes into engagement, is stabilized effectively. Each insertion portion 48 of the pressing member 46B of the fourth embodiment may be formed by an arc-shaped portion, similarly to each insertion portion 48 of the third embodiment shown in FIG. 12.

The present invention is not limited to the embodiment described above, and various additions, modifications, or deletions may be made without departing from the gist of the invention. For example, although, in the above embodiments, the centrifugal clutch 20 has the two pivot members 42 and the two clutch shoes 34, the present invention is also applicable to a centrifugal clutch having three pivot members and the three clutch shoes 34. In this case, the pressing member has three insertion portions. Therefore, these are construed as included within the scope of the present invention.

REFERENCE NUMERALS

20 . . . centrifugal clutch
32 . . . clutch drum
34, 34A . . . clutch shoe
42 . . . stepped bolt (pivot member)
42d . . . head portion
46, 46A, 46B . . . pressing member
48 . . . insertion portion
48a . . . insertion hole
50 . . . connecting portion
C . . . axis
G . . . dimension of gap
T . . . plate thickness
D . . . distance between axes
R . . . radius of curvature

What is claimed is:

1. A centrifugal clutch that intermittently transmits power of rotation about an axis, the centrifugal clutch comprising:
   a clutch drum;
   a plurality of clutch shoes that are pressed against an inner peripheral surface of the clutch drum;
   a plurality of pivot members configured to rotatably support the clutch shoes; and
   a pressing member having a plurality of insertion portions that are inserted between head portions of the pivot members and the clutch shoes, wherein the pressing member has a connecting portion that connects between the plurality of insertion portions, the plurality of insertion portions and the connecting portion forming a curvature that extends between the plurality of insertion portions and along the entire connecting portion.

2. The centrifugal clutch as claimed in claim 1, wherein the plurality of insertion portions and the connecting portion are curved inward in a direction of the axis.

3. The centrifugal clutch as claimed in claim 2, wherein the plurality of insertion portions are provided with a plurality of insertion holes into which the pivot members are inserted.

4. The centrifugal clutch as claimed in claim 2, wherein the plurality of insertion portions each have an arc-shaped portion formed along a portion, closer to the axis, of an outer periphery of each pivot member.

5. The centrifugal clutch as claimed in claim 1, wherein the insertion portions and the connecting portion are curved outward in a direction of the axis.

6. The centrifugal clutch as claimed in claim 1, wherein a gap between the head portions of the pivot members and the clutch shoes is a dimension G, and a plate thickness T of the pressing member is set within the range of 0.4G to 0.6G.

7. The centrifugal clutch as claimed in claim 1, wherein a distance between axes of the pivot members is of a dimension D, and a radius of curvature R formed by the plurality of insertion portions and the connecting portion is set within the range of 2D to 4D.

* * * * *